United States Patent Office 2,750,465
Patented June 12, 1956

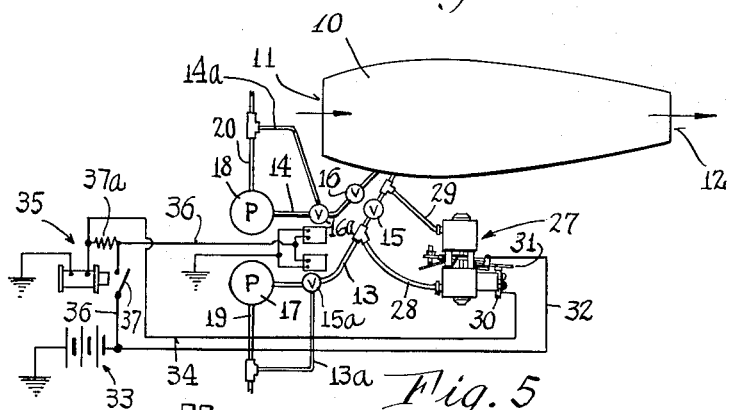
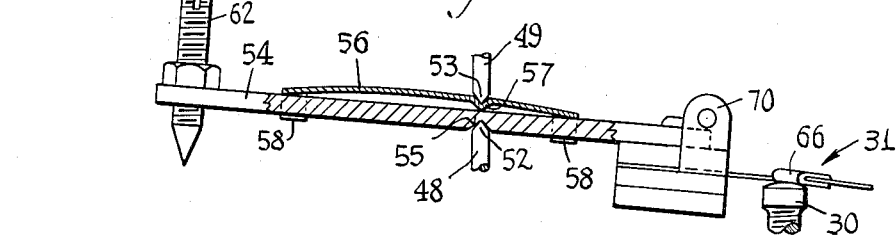
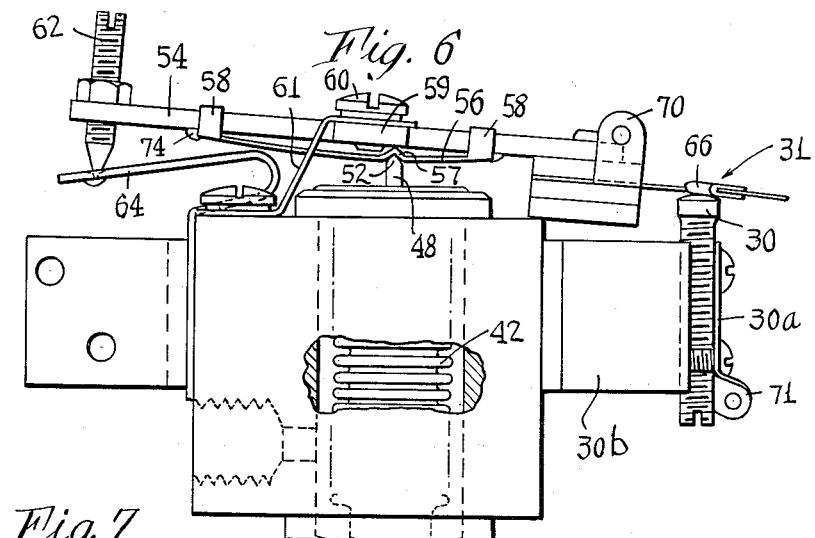
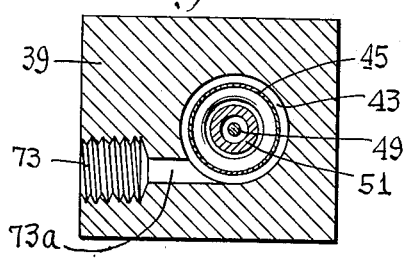

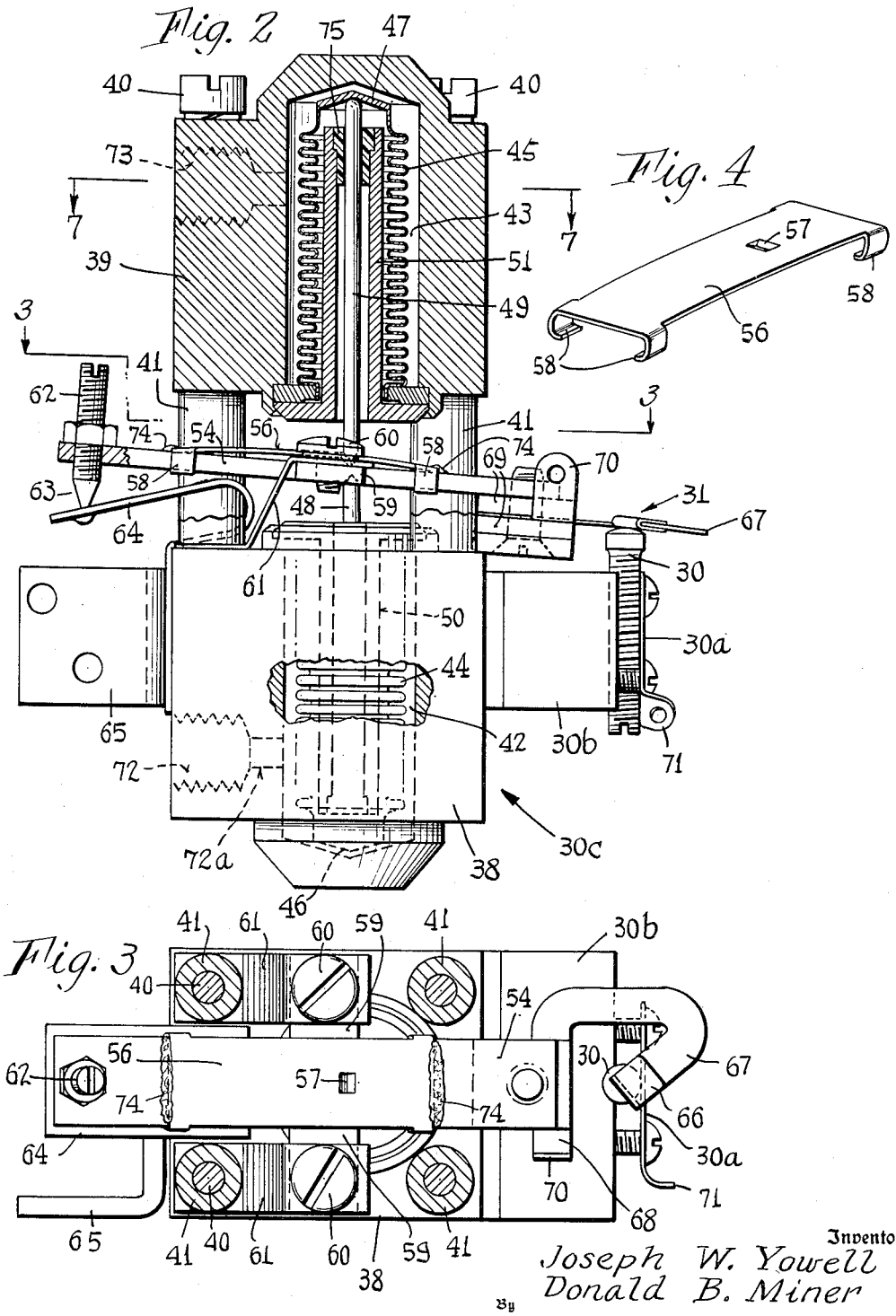

2,750,465

FLUID PRESSURE OPERATED CONTROL

Joseph W. Yowell, Westport, and Donald B. Miner, Stratford, Conn.

Application February 20, 1951, Serial No. 211,936

18 Claims. (Cl. 200—83)

This invention relates to control devices which are responsive to changes in the pressure of a fluid, or to differences in fluid pressures as found, for example, in the fuel line of an engine ahead of and beyond the throttle; and the invention relates more particularly to automatic control means for use with a main and an auxiliary fuel supply system of a combustion engine to prevent stalling of the engine due to failure of the main fuel supply system.

While the invention is illustrated and described in conjunction with the fuel supply system of a jet engine, it should be understood that it is not limited thereto since it has utility with other equipment involving fluid pressures.

An object of the invention is to provide an improved differential-pressure operated automatic control means for use in conjunction with main and auxiliary fuel supply lines of a jet aircraft engine, said means being reliably operative under all conditions encountered in the operation of the engine, functioning to prevent stalling of the engine due to insufficient fuel caused by failure of the main fuel supply system.

Another object of the invention is to provide an improved automatic differential-pressure control means as set forth above, which is relatively simple and economical to manufacture.

Still another object of the invention is to provide an improved control unit responsive to pressure differentials, which may be readily adjusted and preset to obtain a satisfactory response under widely different conditions of pressure such as are encountered in the operation of aircraft.

Still another object of the invention is to provide an improved novel control unit responsive to changes in pressure of a fluid, which unit is effective, reliable and accurate in operation, and small and compact so that it requires but little space.

A still further object of the invention is to provide an improved control unit responsive to changes in pressure of a fluid, which unit may be readily adjusted and calibrated, and is so constituted as to eliminate to a great degree the adverse influence of friction and drag in the moving parts whereby increased reliability is obtained.

In accomplishing the above objects we provide, as illustrated in one specific embodiment of the invention set forth herein, a novel fuel control device for use with a combustion engine and arranged to be connected to the main fuel line thereof, said device being responsive to the drop in fuel pressure in the line, measured between points ahead of and beyond the throttle. As shown herein this control device includes a pair of bellows subjected respectively to the fuel pressures of the line on the opposite sides of the throttle valve. The bellows are connected to a novel force-transmitting system actuating an electric switch, said system including links producing opposing forces on a movable member or lever having a non-fixed pivot point. The organization is such as to reduce friction to a minimum, and maintains the switch open when a high differential is maintained between the two fuel pressures. If, however, the pressure differential drops below a predetermined value for any reason, as for instance because of failure of the main fuel pump, then the bellows are actuated to close the switch and bring into operation an auxiliary fuel pump, connected with a second fuel line supplying the jet engine. Thus stalling of the engine due to failure of the main fuel supply system is automatically prevented. By utilizing a difference of two pressures in the fuel line, the effect of wide variations of atmospheric pressure such as are encountered in aircraft, is minimized to a great extent.

An advantageous feature of the invention resides in the provision of means for shifting the point of application of one of the links on the lever, thereby to compensate for variations in the action of the bellows and enable the forces thereof to be balanced, and also to enable the device to respond to a satisfactory pressure differential curve, taken over a wide range of values.

Another feature of the invention resides in the provision of a novel mounting means for the lever whereby friction is largely eliminated as a factor, and whereby the lever has a non-fixed pivot providing for limited translational movement in addition to its swinging movement. The lever carries on a resilient arm an electrical contact cooperable with a fixed contact, and by virtue of the slight translational movement of the lever together with the resilient contact mounting, a wiping action of the contacts is effected, tending to keep them clean and in operative condition at all times.

A still further object of the invention is to provide an improved insulating mounting for the fixed adjustable contact of the device, whereby an extremely simple and reliable friction detent or lock is obtained automatically, without requiring a separate locking operation on the part of the operator.

A still further object of the invention is to provide an improved, small and compact bellows actuator for a control device, wherein the bellows is protected from the effect of pulsating pressures, largely eliminating fatigue failure of the bellows.

Other features and advantages will hereinafter appear.

In the accompanying drawings:

Figure 1 is a schematic diagram of a jet engine and fuel supply for the same, and an improved automatic control for the fuel supply as provided by this invention.

Fig. 2 is a detail, enlarged, showing partly in section and partly in elevation the improved pressure-differential control device of the invention.

Fig. 3 is a transverse section taken on line 3—3 of Fig. 2.

Fig. 4 is a perspective view of a novel adjustment means provided by the invention, whereby a predetermined desired response of the control may be obtained.

Fig. 5 is a detail of the lever and switch organization of the control, shown partly in section and partly in elevation.

Fig. 6 is an elevational view of a pressure-operated switch, illustrating another embodiment of the invention.

Fig. 7 is a fragmentary section taken on line 7—7 of Fig. 2.

Referring to Fig. 1, there is shown diagrammatically a jet engine 10 having an air intake 11 and an exhaust 12, and having a main fuel line 13 and an auxiliary fuel line 14 connected to the intake manifold (not shown). The fuel lines 13 and 14 are provided with throttle valves 15 and 16 respectively, and with electrically actuated bypass valves 15a and 16a; also the lines 13 and 14 are connected with fuel pumps 17 and 18 supplied through fuel lines 19 and 20, said pumps being continuously powered through a transmission (not shown) from the engine 10.

The bypass valves 15a and 16a are normally not energized, the valve 15a shutting off the bypass line 13a and maintaining open the line 13, and the valve 16a shutting off the line 14 and maintaining open the bypass line 14a.

In accordance with the present invention a novel control means 27 is provided for automatically actuating the valve 16a to close the bypass 14a and supply fuel to the engine 10 through the line 14 in the event of failure of the fuel pump 17 or fuel system associated with the pump 17. This control means is in the form of a fluid pressure operated electric switch controlling the energization of the valve 16a, and is connected with the fuel line 13 by conduits or pipes 28 and 29, the pipe 28 being joined ahead of the throttle valve 15 and the pipe 29 beyond the throttle valve 15. The control 27 includes a pair of electric contacts 30 and 31, the latter being connected by a wire 32 with a battery 33 and the contact 30 being connected by a wire 34 with one terminal of a relay 35. The other terminals of the battery 33 and relay 35 are connected to ground. A wire 36 joins the wire 32, through relay contacts 37, to a pair of terminals of the bypass valves 15a and 16a, and the remaining terminals of the valves are grounded as shown. A resistor 37a connects between the wires 34 and 36.

Referring to Fig. 2, the contact 30 comprises a screw secured by a metal strap 30a to an insulating post or block 30b mounted on a rigid frame or base 30c. The base 30c comprises a pair of blocks 38 and 39 fastened together in spaced relation by screws 40 and spaced collars 41. The blocks 38 and 39 have cylindrical bores 42 and 43 respectively, in which bellows 44 and 45 are mounted, the mouths of the bellows being disposed opposite each other at the adjacent faces of the blocks. The belllows 44 and 45 have movable ends 46 and 47 respectively, engaging push rods 48 and 49 extending through supporting sleeves 50 and 51 rigidly secured to the adjacent faces of the blocks 38 and 39.

The push rods 48 and 49 have pointed ends 52 and 53 adapted to engage opposite sides of a lever 54 carrying at one end the contact 31. Referring to Figs. 2 and 5, one side of the lever 54 is preferably provided with a recess or socket 55 to receive the pointed end 52 of the push rod 48.

In accordance with this invention novel means are provided for adjustably positioning the pointed end 53 of the push rod 49 on the lever 54. This means comprises an elongate rectangular movable member or saddle 56 formed of sheet metal with an indentation or socket 57 intermediate its ends to receive the pointed end 53 of the push rod 49. The corners of the saddle 56 are provided with hooked fingers 58 adapted to embrace opposite longitudinal edge portions of the lever 54, thereby to slidably mount the saddle 56 on the lever for longitudinal movement thereon.

By the present invention the lever 54 is mounted on the base 30c by novel means which largely eliminates friction and provides for a non-fixed pivot effecting an advantageous wiping engagement of the contacts 30 and 31. To provide for this mounting, the lever 54 intermediate its ends has a pair of opposite, laterally extending lugs 59 apertured and threaded to accommodate screws 60 by which resilient arms 61 may be secured to the lugs. The arms 61, Fig. 2, extend downwardly and engage the upper face of the block 38, being clamped and secured to said face by two of the collars 41. Thus the lever 54 is mounted on the block 38 for limited swinging movement as provided for by the resiliency of the arms 61.

Adjustment of tension on the lever 54 is effected by an adjusting screw 62 carried by the end of the lever, having a pointed tip 63 engaging a leaf spring 64 secured to the block 38 by being clamped under a mounting bracket 65.

Referring to Figs. 2 and 3, the contact 31 comprises a strip 66 which may be of precious metal such as silver, folded over on the end of a hooked arm 67 having a base or mounting portion 68 clamped to the end of the lever 54 between insulating washers 69. The base 68 has a terminal lug 70 by which electrical connection may be established to the contact 31. Electrical connection to the contact 30 may be established by a lug 71 on the clamping strip 30a, as shown.

The blocks 38 and 39 are provided with threaded holes 72 and 73 respectively to receive fittings by which the pipes 28 and 29 are attached to the blocks. The holes 72 and 73 respectively communicate with the bores 42 and 43 whereby fluid pressure in the line 13 ahead of the throttle 15 is transmitted to the bellows 44, and fluid pressure in the line 13 beyond the throttle 15 is transmitted to the bellows 45.

The position of the saddle 56 and the tension on the lever 54 exerted by the leaf spring 64 may be so adjusted that the switch contacts 30 and 31 are made to engage each other for different predetermined pressure differences experienced by the bellows 43 and 44. Such pressure differences for example may be 30 pounds, 60 pounds or 120 pounds.

When the saddle 56 has been properly positioned on the lever 54 it may be locked in adjusted position by the application of a suitable heat-resistant, air setting cement, indicated at 74, applied preferably at the ends of the saddle as shown in Figs. 2 and 3.

In accordance with this invention a novel bearing means is provided for the push rods 48 and 49. This bearing means comprises bushings 75 fitted to the inner ends of the supporting sleeves 50 and 51, through which the push rods pass. The bushings 75 are made of Teflon (polymerized tetrafluoroethylene) resin which has the highly desirable characteristics of heat resistance and low coefficient of friction. By the provision of the Teflon bushings 75 there is minimized any tendency for the push rods 48 and 49 to bind during the operation of the control.

Operation of the improved control of this invention is as follows: Normally the solenoid valves 15a and 16a are de-energized making the bypass 14a operative and the bypass 13a inoperative. The pump 18 thus delivers through the bypass 14a, and the pump 17 through the line 13. When the jet engine 10 is started it will receive fuel only through the line 13. With the pump 17 operating, pressure in the fuel line 13 ahead of the throttle 15 will be substantially greater than the pressure in the line beyond the throttle valve, and a sufficient pressure differential will exist to maintain the lever 54 in a position wherein the contact 31 is raised and separated from the contact 30. Accordingly the valves 15a and 16a will remain de-energized. If for some reason a failure of the pump 17 occurs, the pressure in the fuel line 13 ahead of, i. e. before, the throttle valve 15 will immediately drop and approach the pressure existing in the line 13 beyond the throttle valve. Upon this occuring, the bellows 44 will expand due to the drop of pressure in the bore 42 of the block 38, and this will cause the lever 54 to swing clockwise as viewed in Fig. 2, effecting engagement of the contact 31 with the contact 30. Immediately the valves 15a and 16a will be energized, enabling the fuel pump 18 to supply fuel to the engine 10 through the fuel line 14 and making the bypass 13a operative to render ineffective the pump 17. The engine will therefore not be starved for fuel and will continue its operation. The functioning of the control 27 thus automatically and effectively prevents stalling of the jet engine 10 due to failure of the fuel supply through the fuel line 13.

The control unit 27 is extremely compact and small whereby it may be installed in limited space. Moreover, it combines these two advantages with a high degree of reliability by virtue of the provision of the opposed bellows 44 and 45, the resilient antifriction mounting of the lever 54, the antifriction bushings 75 providing bearings for the push rods 48 and 49, and by virtue of the wiping engagement of the contacts. The latter, as above mentioned, is effected by the resiliency of the contact arm 67, and by the lever mounting which does not have a fixed pivot but instead provides for a limited translational or longitudinal movement of the lever when the latter is actuated.

The adjustability feature of the control provided by the saddle 56 which may be shifted longitudinally on the lever 54 contributes greatly to the effectiveness of the control, and provides for satisfactory operation under varied pressure conditions such as are encountered in aircraft jet engines. The reason for this is that the balancing or matching of the bellows 44 and 45 may be accurately accomplished for each control unit prior to its installation, and such matching will exist and be effective regardless of changes in the fluid pressures to which the bellows are subjected. Contributing also is the mounting provided by the resilient arms 61, functioning as above set forth.

In accordance with this invention the blocks 38 and 39 and bellows 44 and 45, together with the ports 72 and 73 in the blocks, are so arranged as to substantially eliminate fatigue failure of the bellows.

Referring to Fig. 7, this is accomplished by offsetting the ports 73 from the centers of the blocks, and by providing channels 72a and 73a which communicate with the bores 42 and 43 of the blocks and which extend in directions substantially tangential to said bores. That is, the channels 72a and 73a extend in directions which make sharp acute angles with the walls of the bores 42 and 43, and with the walls of the bellows 44 and 45. We have found that by so offsetting the ports 72 and 73 and locating the channels 72a and 73a, fluid which passes through the channels into the blocks will not squarely strike the bellows and cause failure thereof by fatigue. Instead, such fluid will strike the bellows along tangential lines, minimizing fatigue of the bellows.

Another embodiment of the invention is shown in Fig. 6, wherein the lever 54 is actuated to operate the switch contacts 30 and 31 in response solely to movement of the bellows 42. For such organization, the saddle 56 is applied to the underside of the lever 54 so that the socket 57 of the saddle receives the pointed end 52 of the push rod 48. Shifting of the saddle 56 on the lever 54 provides a second means of adjustment of the control, in addition to adjustment by turning the screw 62 on the end of the lever.

Variations and modifications may be made within the scope of the claims and portions of the improvements may be used without others.

We claim:

1. A control responsive to differences in fluid pressures, comprising a pair of translating devices having movable parts, for translating pressure differences into mechanical movements of said parts; control means having a movable member comprising two thin, superposed, engaging plates; two link means connected respectively with said movable parts and engaging said member on opposite sides of the plates at closely juxtaposed points, separated only by the thickness of the plates, for applying opposing forces from the parts to said member; and adjustment means for shifting the point of engagement of one of said link means with respect to the point of engagement of the other link means, thereby to adjust the response of the control.

2. An electric control responsive to differences in fluid pressures, comprising a pair of translating devices having movable parts, for translating pressure differences into mechanical movements of said parts; an electric switch having a movable actuator comprising two thin, superposed, engaging plates; two link means connected respectively with said movable parts and engaging said actuator on opposite sides of the plates at closely juxtaposed points, separated only by the thickness of the plates, for applying opposing forces from the parts to said actuator; and adjustment means for shifting the point of engagement of one of said link means with respect to the point of engagement of the other link means, thereby to alter the pressure differential value at which the switch is actuated.

3. A control responsive to differences in fluid pressures, comprising a lever having two thin, superposed, engaging plates; control means actuated by said lever; a pair of translating devices disposed on opposite sides of the lever, said devices having movable parts and translating pressure differences into mechanical movements of said parts; two link means respectively connected with said movable parts and engaging said lever on opposite sides of the plates at closely juxtaposed points, separated only by the thickness of the plates, for applying opposing forces from the parts to said lever; and means for shifting the point of engagement of one of said link means with respect to the point of engagement of the other linke means, thereby to adjust the response of the control.

4. A control responsive to differences in fluid pressures, comprising a lever having two thin, superposed, engaging plates; means mounting the lever for swinging movement, including a base and resilient arms engaged with the base and lever; control means actuated by said lever; a pair of translating devices mounted on said base and disposed on opposite sides of the lever, said devices having movable parts and translating pressure differences into mechanical movements of said parts; two link means respectively connected with said movable parts and engaging said lever on opposite sides of the plates at closely juxtaposed points separated only by the thickness of the plates, for applying opposing forces from the parts to said lever; and means carried by the lever, for shifting the point of engagement of one of said link means with respect to the point of engagement of the other link means, thereby to adjust the response of the control.

5. A control responsive to differences in fluid pressures, comprising a pair of bellows; control means having a movable member comprising two thin, superposed, engaging plates; two link means respectively connected with said bellows and engaging said member on opposite sides of the plates at closely juxtaposed points separated only by the thickness of the plates, for applying opposing forces from the bellows to said member; and adjustment means for shifting the point of engagement of one of said link means with respect to the point of engagement of the other link means, thereby to adjust the response of the control.

6. A control responsive to differences in fluid pressures, comprising a base; a pair of bellows mounted mouth to mouth on the base; control means having a movable member extending between the mouths of the bellows; supporting sleeves carried by the base, extending into the bellows; push rods engaging opposite sides of the movable member and extending through said supporting sleeves, said rods respectively engaging the ends of the bellows; adjustment means for shifting the point of engagement to one of said push rods with said member to adjust the response of the control; and bearings of heat-resistant, antifriction plastic material carried by the supporting sleeves closely adjacent the engaged ends of the bellows and providing bearings for said push rods.

7. A control responsive to differences in fluid pressures, comprising a lever having two thin, superposed, engaging plates; control means actuated by said lever; a pair of translating devices disposed on opposite sides of the lever, said devices having movable parts and translating pressure differences into mechanical movements of said parts; two link means respectively connected with said movable parts and engaging said lever on opposite sides of the plates at closely juxtaposed points separated only by the thickness of the plates, for applying opposing forces from the parts to said lever; means carried by the lever for shifting the point of engagement of one of said link means with respect to the point of engagement of the other link means, thereby to adjust the response of the control, said means including a mounting for one of said plates enabling it to be slidable longitudinally on the other plate, said one plate having a socket for receiving a part of said link means; and means locking said plates together in adjusted position.

8. A control responsive to differences in fluid pressures, comprising a lever; control means actuated by said lever; a pair of translating devices disposed on opposite sides of the lever, said devices having movable parts and translating pressure differences into mechanical movements of said parts; link means connected with said movable parts and engaging said lever, for applying opposing forces from the parts to said lever; means carried by the lever for shifting the point of engagement of one of said link means with said lever, thereby to adjust the response of the control, said means comprising an elongate member slidable longitudinally on the lever, having fingers at its ends extending around the lever to retain the member thereon, and having a socket for receiving a part of said link means; and means cementing said member to the lever in adjusted position.

9. A control responsive to changes in fluid pressure, comprising a bellows; control means having a movable member; a supporting sleeve extending into the bellows; a push rod extending through said supporting sleeve, engaging the movable member and the end of the bellows; and a bearing of heat-resistant, anti-friction plastic material carried by the supporting sleeve closely adjacent the engaged end of the bellows and providing a bearing for said push rod.

10. A control responsive to changes in fluid pressure, comprising a translating device having a movable part, for translating pressure changes into mechanical movements of said part; a lever; control means actuated by the lever; link means connected with said movable part and lever, for transmitting force from said part to the lever to actuate said control means; and means fastened to and carrying said lever, mounting the lever for swinging movement about a non-fixed pivot, said means including a base and resilient arms engaging and extending between the base and the lever, said arms engaging the lever at points remote from each other.

11. A control responsive to changes in fluid pressure, comprising a translating device having a movable part, for translating pressure changes into mechanical movements of said part; a lever; control means actuated by the lever; link means connected with said movable part and lever, for transmitting force from said part to the lever to actuate said control means; and adjustment means for shifting the point of engagement of the link means with the lever, thereby to adjust the response of the control, said lever comprising a pair of thin, superposed, engaging plates, and said adjustment means comprising means slidably mounting one plate on the other.

12. A control responsive to differences in fluid pressures, comprising a pair of bellows mounted mouth to mouth; control means having a movable member comprising two thin, superposed, engaging plates extending between the mouths of the bellows; two link means extending into the bellows, connected respectively with the ends of the bellows and engaging said member on opposite sides of the plates at closely juxtaposed points separated only by the thickness of the plates, for transmitting opposing forces from the bellows to the member; and adjustment means for shifting the point of engagement of one of said link means with respect to the point of engagement of the other link means, thereby to obtain a desired response of the control.

13. A control responsive to changes in fluid pressure, comprising a translating device having a movable part, for translating pressure changes into mechanical movements of said part; a lever; control means actuated by said lever; a push rod connected between the lever and said movable part; adjustment means for shifting the point of engagement of the push rod with the lever, thereby to obtain a desired response of the control means, said adjustment means comprising a member slidable longitudinally on the lever, having a socket for receiving the end of said push rod; and means locking said member to the lever in adjusted position.

14. A control responsive to changes in fluid pressure, comprising a bellows; control means having a movable member; a supporting sleeve extending into the bellows; a push rod engaging the movable member and extending through said supporting sleeve, said rod engaging the end of the bellows; adjustment means for shifting the point of engagement of the push rod with said member to obtain a desired response of the control; and a bearing of heat-resistant, antifriction plastic material carried by the inner end of the supporting sleeve closely adjacent the engaged end of the bellows and providing a bearing for said push rod.

15. A control responsive to changes in fluid pressure, comprising a translating device having a movable part, for translating pressure changes into mechanical movement of said part; a lever; control means actuated by the lever; link means connected with said movable part and lever, for transmitting force from said part to the lever to actuate said control means; means mounting the lever for swinging movement about a non-fixed pivot, said means including a base, a pair of resilient arms secured to and extending between the base and the lever, and a leaf spring secured to the base and extending adjacent the lever; and an adjustment screw carried by the lever, having a pointed end engaging the leaf spring, said spring having a socket receiving said end whereby movements of the lever are partially controlled by said leaf spring.

16. In a control device, a base part; a lever part; control means actuated by the lever part; means mounting the lever part for swinging movement about a non-fixed pivot, said means including a resilient arm secured to and extending between said parts; and a leaf spring mounted on one of said parts, having a socket, the other part having a pointed projection engaging said spring and extending into the socket thereof.

17. In an electrical switch, mounting means for a contact, comprising a block of insulating material having a groove in one face, and having screw threads in said groove; a screw disposed in said groove, engaging the threads thereof; a contact carried by the screw; a resilient metal strip extending transversely and diagonally across the screw, said strip having a terminal lug adjacent one end; and means securing end portions of the strip to the block, said means bowing the strip over the screw and thereby maintaining the latter in adjusted position on the block.

18. In an electrical switch, mounting means for a contact, comprising a block of insulating material having a groove in one face, and having screw threads in said groove; a screw disposed in said groove, engaging the threads thereof; a contact carried by the screw; a resilient metal strip extending transversely across the screw; and means securing end portions of said strip to the block, said means bowing the strip across the screw and maintaining the latter in adjusted position on the block.

References Cited in the file of this patent

UNITED STATES PATENTS

| Number | Name | Date |
|---|---|---|
| 1,387,746 | Webb | Aug. 16, 1921 |
| 1,414,912 | Whittingham | May 2, 1922 |
| 1,567,592 | Hesselman | Dec. 29, 1925 |
| 1,670,313 | Oswald | May 22, 1928 |
| 1,704,370 | Phelan | Mar. 5, 1929 |
| 1,719,851 | Raney | July 9, 1929 |
| 1,847,086 | Gargan | Mar. 1, 1932 |
| 1,936,051 | Durdin | Nov. 21, 1933 |
| 2,213,505 | Raney | Sept. 3, 1940 |
| 2,226,297 | Spangenberg | Dec. 24, 1940 |
| 2,283,175 | Berger | May 19, 1942 |
| 2,333,401 | Woods | Nov. 2, 1943 |
| 2,335,943 | Jones | Dec. 7, 1943 |
| 2,348,113 | Davis | May 2, 1944 |
| 2,376,144 | Levine | May 15, 1945 |
| 2,409,931 | Curtis | Oct. 22, 1946 |
| 2,463,891 | Malone | Mar. 8, 1949 |
| 2,487,213 | Bender | Nov. 8, 1949 |